United States Patent
Schwager

(10) Patent No.: US 9,172,433 B2
(45) Date of Patent: Oct. 27, 2015

(54) POWER LINE COMMUNICATION APPARATUS INCLUDING AC POWER SOCKET

(75) Inventor: Andreas Schwager, Waiblingen (DE)

(73) Assignee: SONY Corporation, Tokyo (JP)

(*) Notice: Subject to any disclaimer, the term of this patent is extended or adjusted under 35 U.S.C. 154(b) by 793 days.

(21) Appl. No.: 13/352,788

(22) Filed: Jan. 18, 2012

(65) Prior Publication Data

US 2012/0201312 A1 Aug. 9, 2012

(30) Foreign Application Priority Data

Feb. 7, 2011 (EP) .................................... 11000956

(51) Int. Cl.
*H04B 3/00* (2006.01)
*H04B 3/56* (2006.01)

(52) U.S. Cl.
CPC .......... *H04B 3/56* (2013.01); *H04B 2203/5454* (2013.01); *H04B 2203/5491* (2013.01)

(58) Field of Classification Search
None
See application file for complete search history.

(56) References Cited

U.S. PATENT DOCUMENTS

| | | | | |
|---|---|---|---|---|
| 5,805,053 | A * | 9/1998 | Patel et al. .................... | 375/257 |
| 6,747,859 | B2 * | 6/2004 | Walbeck et al. ............. | 361/93.1 |
| 6,842,668 | B2 * | 1/2005 | Carson et al. ................. | 700/286 |
| 6,987,430 | B2 * | 1/2006 | Wasaki et al. ................. | 333/124 |
| 7,199,699 | B1 * | 4/2007 | Gidge ........................ | 340/12.32 |
| 7,795,994 | B2 * | 9/2010 | Radtke ........................ | 333/100 |
| 2008/0190639 | A1 | 8/2008 | Baran et al. | |
| 2010/0019862 | A1 * | 1/2010 | Feng et al. .................... | 333/181 |
| 2011/0206140 | A1 * | 8/2011 | Schwager et al. ............ | 375/257 |

FOREIGN PATENT DOCUMENTS

| | | |
|---|---|---|
| EP | 1 617 538 A1 | 1/2006 |
| EP | 1 816 755 A2 | 8/2007 |
| WO | WO 2010020298 A1 * | 2/2010 |

OTHER PUBLICATIONS

"Electronic filter topology", as published Jun 9, 2010 as retrieved by web.archive.org, retrieved from <http://web.archive.org/web/20100609061703/http://en.wikipedia.org/wiki/Cauer_topology_(electronics)#Ladder_topologies>, retrieved Aug. 15, 2014.*

(Continued)

*Primary Examiner* — Rexford Barnie
*Assistant Examiner* — David Shiao
(74) *Attorney, Agent, or Firm* — Oblon, McClelland, Maier & Neustadt, L.L.P.

(57) ABSTRACT

A power line communication apparatus (200) includes a mains power connector assembly (210) with three or more first connectors (211) connectable to a mains distribution network. A mains filter (220) provides a filter path between each of its first ports (221) and a corresponding one of second ports (222), wherein each first port (221) is connected to one of the first connectors (211). Each second port (222) is connected to one of three or more second connectors (282) of an AC power socket (280). A power line communication unit (250) is connected with each of the first ports (221) and transmits and/or receives data according to a transmission method using more than one transmission channel between two devices connected via the mains distribution network. The mains filter (220) improves PLC transmission quality by suppressing disturbances generated by the appliances and reduces PLC stray radiation.

13 Claims, 3 Drawing Sheets

(56) References Cited

OTHER PUBLICATIONS

Chan K., "Design of Differential Filters for High-Speed Signal Chains", published Apr. 2010, Texas Instruments, retrieved from <http://www.ti.com/lit/an/slwa053b/slwa053b.pdf> on Mar. 25, 2015.*

Kuphaldt T. R., "Lessons in Electric Circuits—vol. II: Chapter 8: Filters", as published Nov. 25, 2010 as retrieved by web.archive.org, retrieved from <http://web.archive.org/web/20101125065637/http://www.ibiblio.org/kuphaldt/electricCircuits/AC/AC_8.html> on Mar. 25, 2015.*

U.S. Appl. No. 13/502,774, Jun. 11, 2012, Schwager, et al.

Extended European Search Report issued Mar. 20, 2012 in Patent Application No. 11008948.9.

Chinese Office Action and Search Report issued Nov. 2, 2014 in Patent Application No. 2012100239583 (with English language translation).

* cited by examiner

POWER LINE COMMUNICATION APPARATUS INCLUDING AC POWER SOCKET

Embodiments of the invention refer to a power line communication apparatus comprising an AC (alternating current) power socket and a method of operating a power line communication apparatus.

Some communications systems like PLC (power line communications) use power distribution systems for data communication, wherein a modulated carrier is superimposed to the 50 or 60 Hz alternating current of the power lines. For example, a power cable containing two or more electrical conductors is used for transmission of AC (alternating current) electric power, wherein the power cable may be installed as permanent wiring within buildings or may be buried in the ground. Power line communication modems may be plugged into any outlet of the power distribution system.

The object of the invention is to increase ease of use of a power line communication system. The object is achieved with the subject-matter of the independent claims. Further embodiments are defined in the dependent claims, respectively. Details and advantages of the invention will become more apparent from the following description of embodiments in connection with the accompanying drawings. Features of the various embodiments may be combined unless they exclude each other.

Figure 1:
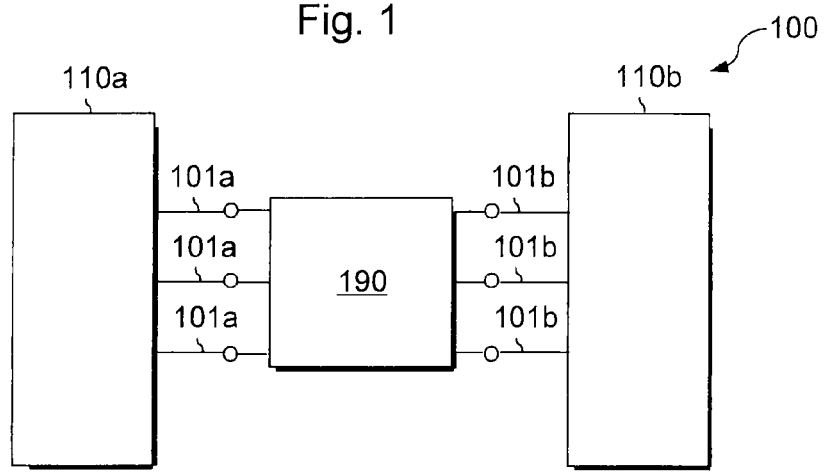
FIG. 1 is schematic block diagram of a power line communications system comprising a power line communication apparatus in accordance with an embodiment of the invention.

FIG. 1 refers to a communications system 100 using a power distribution system 190 for data communication. By way of example, the communications system 100 may be a power line communications (PLC), mains communications, power line telecommunications (PLT), broadband power line (BPL) or power band or power line networking (PLN) system using a modulated carrier superimposed to the 50 or 60 Hz alternating current of the power lines respectively.

The communications system 100 is operable as a MIMO (multiple input multiple output) or MISO (multiple input single output) system with at least a first and a second modem device 110a, 110b. The first modem device 110a outputs data signals at two or more first interface ports 101a. The second modem device 110b recovers the data signals from signals received at three or more second interface ports 101b. The power distribution system 190 forms the transmission channel connecting the first and second modem devices 110a, 110b. The power distribution system 190 represents a multi-wire connection. For example, the power distribution system 190 may include power cables comprising two or more electrical conductors used for transmission of AC electric power (mains) and for providing earth connection, wherein the power cables may be installed as permanent wiring within buildings or may be buried in the ground.

For example, the first modem device 110a may output two differential transmit signals using the live or phase wire (L, P), the neutral wire (N), and protective earth (PE), wherein the differential transmit signals are modulated on a carrier superposing the AC frequency on the mains voltage. The second modem device blob may receive three differential receive signals between live wire and neutral wire, between neutral wire and protective earth, and between live wire and protective earth. According to another embodiment, the second modem device 110b may receive the three differential receive signals and a common mode signal resulting from a leakage current from the wiring as a fourth receive signal. The transmit signals in the transmission channel 190 interfere with each other through capacitive coupling between the wires such that the first and second modems may use multi-channel techniques like beamforming for enhancing transmission throughout.

Figure 2:
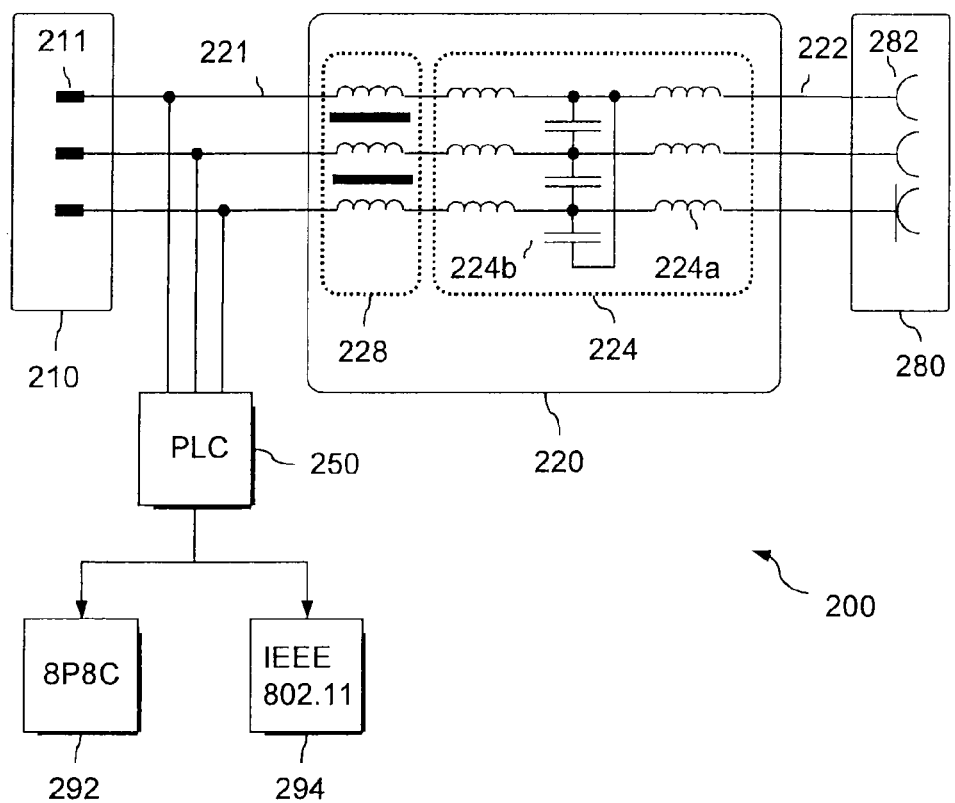
FIG. 2 is a schematic block diagram showing details of a power line communication apparatus with a mains filter in accordance with another embodiment of the invention.

One of the first and second modem devices 110a, 110b is a power line communication apparatus 200 as illustrated in FIG. 2. The other modem device 110a, 110b may also be of the type of the power line communication apparatus 200, another stand-alone type PLC modem or may be integrated in an electronic device for consumer applications, for example in a storage unit, a television set, an audio receiver, a video recorder, or in sensor devices.

As shown in FIG. 2, the power line communication apparatus 200 comprises a mains power connector assembly 210 with at least three first connectors 211. Each of the first connectors 211 is adapted to connect the power line communication apparatus 200 to one of the wirings L1, L2, L3, N, PE of a power distribution system. According to an embodiment the first connectors 211 are terminals, for example clamps or connector blocks into which the wirings L1, L2, L3, N, PE may be clamped. According to another embodiment, the mains power connector assembly 210 is a mains power plug where at least two of the first connectors 211 assigned to live and neutral connections are pins or prongs. The mains power plug may be a standardized one, for example a mains power plug in accordance with the CEE 7/4, 7/5, 7/7, NEMA5-nn or SEV1011 standard.

The power line communication apparatus 200 further includes a mains filter 220 with at least three first ports 221 and a corresponding number of second ports 222. Each first port 221 is electrically connected to one of the first connectors 211. According to an embodiment each first port 221 is directly connected with the corresponding first connector 211 in a low resistive manner through wires, conductors, and/or clamps. The mains filter 220 comprises a low-pass filter path between each first port 221 and a corresponding one of the second ports 222.

An AC power socket (receptacle) 280 comprises at least three second connectors 282, wherein each second connector 282 is electrically connected to one of the second ports 222 of the mains filter 220. At least two of the second connectors 282 assigned to live and neutral connections are female connectors. The AC power socket 280 may by standardized and may comply with any of the CEE 7/4, 7/5, 7/7, NEMA5-nn or SEV1011 standards, by way of example. In case the mains power connector assembly 210 is a standardized mains power plug, the AC power socket 280 may comply with the same standard. A power strip or an electric/electronic appliance may be plugged into the AC power socket to connect an electric/electronic appliance to the mains power distribution system.

A power line communication unit 250 is electrically connected with each of the first connectors 211 and first ports 221, wherein the power line communication unit 250 is configured to transmit and/or receive data according to a transmission method using more than one wired connection or transmission path between two devices connected via the power distribution wiring. The power line communication unit 250 includes a power lines communication modem that may be configured as a receiving device, as a transmitting device or as bidirectional communication device incorporating the functionalities of both a receiving and a transmitting device. The power lines communication modem may be a PLC modem, a mains communications modem, a PLT modem, a BPL modem or a power band or PLN modem.

The power line communication apparatus 200 with integrated AC power socket 280 and mains filter 220 allows the user to easily install or plug a power line modem into any outlet which is convenient to access for him and without that the outlet is lost for connecting further electric/electronic appliances. The data signals go directly from the integrated power line communication unit 250 to the wall outlet and the power distribution wiring. Neither do they radiate nor are they attenuated by the cable resistance of a multiple-outlet power strip, which often has to be installed for providing a sufficient number of outlets for appliances and modems.

In addition, the mains filter 220 suppresses disturbances and noise from appliances connected to the AC power socket 280. Since Appliances connected to the filtered AC power socket 280 cannot cause asymmetry to the mains at the respective outlet, differential mode MIMO signals of the power line communication unit 250 are not converted into common mode signals that may radiate from the mains. Hence the system emits less stray radiation.

According to an embodiment, at least one of the first connectors 211 of the mains power connector assembly 210 is an earth (grounding) connection and at least one of the second connectors 282 of the AC power socket 280 is an earth connection. The filter paths may differ in their effect on the assigned wired connection. According to an embodiment each filter path provides interference suppression. For example, each filter path provides interference suppression to approximately the same degree.

In accordance with an embodiment, the mains filter 220 includes a low-pass filter 224 which is effective on each of the at least three filter paths. Where one of the filter paths provides an earth connection, the low-pass filter 224 is also effective on this filter path approximately to the same degree. For example, the low-pass filter 224 includes filter elements in each of the filter paths, including a filter path assigned to an earth connection, wherein corresponding filter elements of different filter paths have the same nominal values such that all at least three filter paths are configured in the same way. According to an embodiment, the low-pass filter 224 attenuates signal frequencies above 1 MHz, for example in the range between 2 and 30 MHz by at least 3 dB, for example 6 dB, 10 dB or 20 dB. According to an embodiment the attenuation is at least 50 dB. According to other embodiments, the mains filter 220 attenuates another frequency-range above a frequency greater 2 MHz to comply with the specific frequency range of the powerline communication unit 250.

The low-pass filter 224 may contain serial filter elements 224a in each filter path. The serial filter elements 224a may differ from each other. In accordance with an embodiment, the serial filter elements 224a in each filter path may be elements that are approximately equivalent to each other with regard to the effect they have. For example, each serial filter element 224a may be effective as a low-pass filter that lets pass the 50 Hz or 60 Hz AC frequency and that blocks HF (high frequency) and VHF (very high frequency). The low-pass filter 224 may provide the same filter degree and the same cutoff frequencies in each filter path. Each serial filter element 224a may include one or more inductors, wherein corresponding inductors in different filter paths may have the same nominal values for inductivity and resistance. The low-pass filter 224 may also comprise a number of capacitive units 224b, wherein each capacitive unit 224b is electrically arranged between each pair of filter paths. Each capacitive unit 224b may provide a parallel filter path with a cutoff frequency defining a pass-band effective up to at least 50 Hz or 60 Hz and blocking HF and VHF. Each capacitive unit 224b may include one ore more capacitors. According to an embodiment, at 1 MHz each filter path may provide an attenuation of at least 40 dB. Each capacitive unit 224b may be connected to a node between two identical inductors of the same filter path, respectively.

According to an embodiment the mains filter 220 may also include a common-mode filter unit 228 to attenuate common mode signals. The common filter unit 228 may include a common mode choke, a ferrite bead or ring. The common filter unit 228 is effective on each of the at least three filter paths in the same way and to the same degree. For example, elements with the same nominal values for inductivity, resistance and coupling values may be provided in each filter path such that all at least three filter paths are configured in the same way. Where one of the filter paths provides an earth connection, the elements are provided in this filter path, too.

The power line communication apparatus 200 may have four first connectors 211 for two live connections L1, L2, a neutral connection N and an earth connection, or five connectors for three live connections L1, L2, L3, a neutral connection N and an earth connection PE. According to an embodiment, the power plug comprises three first connectors 211 for one live connection L, a neutral connection N and the earth connection PE.

The power line communication apparatus 200 may further comprise a data outlet 292 connected to the power line communication unit 250, wherein the power line communication unit 250 outputs data received via the mains power connector assembly 210 at the data outlet 292 and/or outputs data received via the data outlet 292 at the mains power connector assembly 210. The data outlet 292 may be a standardized one, for example according to the USB, Ethernet, Firewire or any other wired communication standard.

Alternatively or in addition, the power line communication apparatus 200 may comprise a wireless modem 294 connected to the power line communication unit 250, wherein the power line communication unit 250 outputs data received via the mains power connector assembly 210 via the wireless modem 294 and/or outputs data received via the wireless modem 294 via the mains power connector assembly 210. The wireless modem may be a standardized one and may comply with the IEEE 802.11 standard by way of example.

Figure 3A:
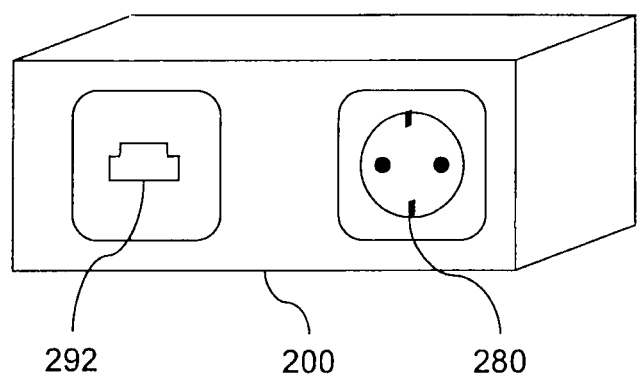
FIG. 3A is a simplified perspective view of a power line communication apparatus in accordance with an embodiment related to a wall-mounted outlet.

FIG. 3A shows an on-wall or in-wall mounted power line communication apparatus 200 with an AC power socket 280, which may be a CEE 7/7 socket, and a data outlet 292, which may be a female modular connector, like a 8P8C jack (socket). Terminals at the backside oriented to the wall side provide interfaces to the power distribution wiring.

Figure 3B:
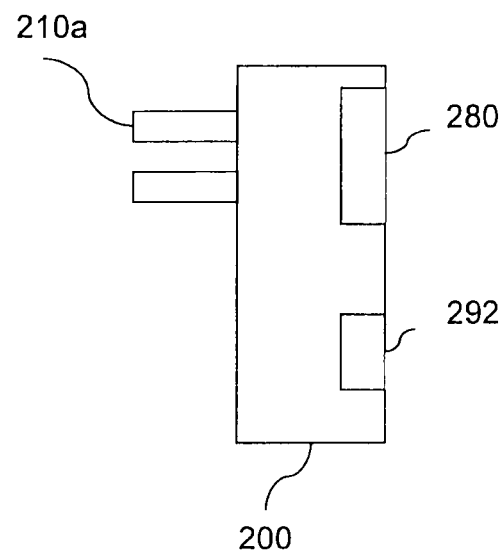
FIG. 3B is a simplified side view of a power line communication apparatus including a mains power plug in accordance with an embodiment.

FIG. 3B shows a plug-in power line communication apparatus 200 with an AC power socket 280, a data outlet 292, and a mains power plug 210a, which may be CEE 7/7 plug, by way of example.

Figure 4:
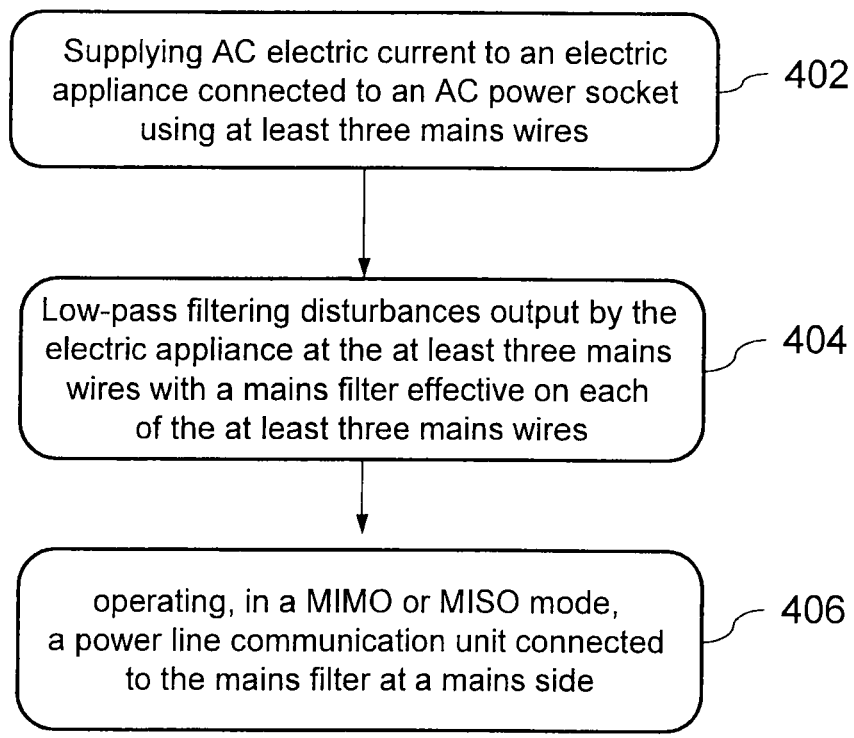
FIG. 4 is a simplified flowchart of a method of operating a power line communication apparatus according to a further embodiment.

FIG. 4 refers to a method of operating a power line communication apparatus. AC electric current is supplied to an electric appliance connected to an AC power socket using at least three mains connections (402). The at least three mains connections may provide two live connections and a neutral connection. According to an embodiment one of the at least three mains connections provides an earth connection. Noise and disturbances output by the electric appliance at the mains connections are low-pass filtered using a mains filter effective on each of the at least three mains connections (404) in the same way. According to an embodiment, each low-pass filter path of the mains filter provides interference suppression. The mains filter has a mains side oriented to the mains and an appliance side oriented to the AC power socket. A power line communication unit that is connected to the mains side of the mains filter is operated in a MIMO or MISO mode (406). The mains filter attenuates signal frequencies in the range used by the powerline communication unit and may attenuate common-mode signals.

The invention claimed is:

1. A power line communication apparatus comprising:
a mains power connector assembly comprising at least three first connectors, wherein one of the at least three first connectors is configured to be an earth connection;
a mains filter having at least three first ports, at least three second ports, at least three filter paths one of which is an earth filter path, and a low-pass filter including a subsection of each of the at least three filter paths, wherein each first port is electrically connected to the respective first connector, each filter path is provided between the respective first port and the respective second port, and the low-pass filter includes inductive and capacitive units symmetrically configured to low-pass filter the at least three filter paths, and
the inductive and capacitive units are arranged symmetrically among the at least three low-pass filter paths and each of the at least three low-pass filter paths is capacitively coupled to all other of the at least three low-pass filter paths;
an alternating current (AC) power socket comprising at least three second connectors, wherein each second connector is electrically connected to the respective second port, and one second connector is configured to be an earth connection; and
a power line communication circuit electrically connected with each of the first ports, wherein the power line communication circuit is configured to transmit and/or receive data according to a transmission method using more than one transmission channel between two devices connected via a power line wiring.

2. The power line communication apparatus of claim 1, wherein the mains power connector assembly is a mains power plug.

3. The power line communication apparatus of claim 1, wherein
the low-pass filter is arranged to provide a same degree of interference suppression in each of the at least three filter paths.

4. The power line communication apparatus of claim 1, wherein
the low-pass filter comprises series inductive units in each filter path, and each series inductive unit has an inductance and resistance equal to each of an other series inductive units.

5. The power line communication apparatus of claim 1, wherein
the low-pass filter comprises respective capacitive units between each pair of the at least three filter paths.

6. The power line communication apparatus of claim 1, wherein
at 1 MHz, each respective filter path of the at least three filter paths provides equivalent attenuation of at least 50 dB.

7. The power line communication apparatus of claim 1, wherein
the mains filter comprises a common-mode filter effective on each of the at least three filter paths.

8. The power line communication apparatus of claim 1, wherein
the mains power connector assembly comprises not more than three first connectors.

9. The power line communication apparatus of claim 1, further comprising
a data outlet connected to the power line communication circuit, the power line communication circuit configured to output data received via the mains power connector assembly at the data outlet and/or to output data received via the data outlet at the mains power connector assembly.

10. The power line communication apparatus of claim 1, further comprising
a wireless modem connected to the power line communication circuit, the power line communication circuit configured to output data received via the mains power connector assembly through the wireless modem and/or to output data received via the wireless modem at the mains power connector assembly.

11. A method of operating a power line communication apparatus, the method comprising:
supplying alternating current (AC) electric current to an electric appliance connected to an AC power socket using at least three mains connections, wherein one of the at least three mains connections is configured to be an earth connection,
filtering noise and disturbances output by the electric appliance at the at least three mains connections with a mains filter filtering respective filter paths of the at least three mains connections, the mains filter having a mains side oriented to the least three mains connections and an appliance side oriented to the AC power socket, wherein the mains filter includes a low-pass filter having inductive and capacitive units symmetrically configured among the filter paths in order to low-pass filter the respective filter paths of the at least three mains connections, and in the low-pass filter each filter path is capacitively coupled to all other filter paths of the at least three mains connections; and
operating, in a multiple-input-multiple-output (MIMO) or multiple-input-single-output (MISO) mode, a power line communication circuit connected to the mains filter at the mains side.

12. The method of claim 11, wherein
the mains filter filters each of the at least three mains connections with equivalent attenuation and dispersion as a function of frequency.

13. A power line communication apparatus comprising:
mains connector means comprising at least three first connectors, wherein one of the at least three first connectors is configured to be an earth connection;
filter means with at least three first ports, each first port connected to a respective first connector, and with at least three second ports, each second port connected to a respective first port via a respective low-pass filter path, wherein each low-pass filter path is symmetric with respect to each of the other low-pass filter paths and each low-pass filter path is capacitively coupled to each of the other low-pass filter paths;

receptacle means comprising at least three second connectors, each second connector electrically connected to a respective one of the second ports, wherein one of the at least three second connectors is configured to be an earth connection; and power line communication means electrically connected with each of the first connectors and first ports, wherein the power line communication means is configured to transmit and/or receive data according to a transmission method using more than one transmission channel between two devices connected via a power line wiring.

* * * * *